Patented Dec. 11, 1928.

1,694,540

UNITED STATES PATENT OFFICE.

KARL HARR, OF HORDE, GERMANY.

SINTERED MAGNESITE BRICK AND METHOD OF MAKING THE SAME.

No Drawing. Application filed November 10, 1923, Serial No. 674,002, and in Germany November 14, 1922.

Many natural magnesites and the magnesia, artificially produced from dolomite or magnesia lye (final solution at the alkali production), are not suited for the manufacturing of magnesite bricks on account of their purity. During the World War, when natural magnesites could not be obtained, it has been proposed to produce magnesite bricks from the obtainable but less suitable magnesites or from artificial magnesia in admixing iron ores, lime, silicic acid and alumina with the magnesite or with the artificial magnesia. The magnesite bricks thus obtained were much inferior to the magnesite bricks made from natural magnesite of suitable composition (especially in Styrmark). This manufacturing method has therefore been given up.

The method according to the invention consists in mixing the pure natural magnesites as well as the magnesia artificially produced from dolomite or magnesia solution with the aniline oil residues from the aniline manufacture, so called ferric oxides mixed with a substantial portion of residual aniline oil and the products of side reactions and of impurities, whereupon it is dried or moulded into bricks compressed and baked

*Example.*—The magnesia slime resulting from the alkali solution, which at the state in which it is produced in many chemical works contains approximately 50–60% of water and 35–40% of magnesia besides small quantities of lime, ferric oxide, alumina, silicic acid, sulphuric acid and chlorine as impurities, is admixed with so much "ferric oxide" from the aniline oil production that after the baking the finished brick contains 84–89% $MgO$, 4–8% $Fe_2O_3$, 0.1–2.5% $Al_2O_3$, 1–2.5% $CaO$ and 2–6% $SiO_2$. The bricks possess a resistance against fire of 1670–1750° C.

This composition has been found particularly advantageous. The advantage appears to lie partly in the fact that the presence of aniline oil residues serve as a binder in holding the mass of the brick together before baking and in the early stages of baking, thereby allowing the desired recrystallization to occur more readily. There appears to be a further advantage in the composition above disclosed in that a partial reduction of the iron may occur in the early stages of the baking due to the presence of the carbonaceous oil residues. These residues of oil and a variety of by-products of various types occur, the composition of which has not as yet been determined with certainty. The material carbonizes, however, in the course of the baking and reactions occur between the carbon decomposition product and the iron, which aid in the penetration of the iron oxide into the crystalline structure of the magnesia. In this way a product much more closely resembling the desirable natural product of magnesia containing the desired small amount of ferric oxide in the particular crystalline condition, is obtained.

Having now particularly described and ascertained the nature of my said invention and in what manner the same is to be performed, I declare that what I claim is:

1. The method of producing sintered magnesite refractory material, which comprises mixing relatively pure natural magnesite with aniline oil residues and sintering the mixture.

2. The method of producing sintered magnesia refractory material which comprises mixing magnesia with aniline oil residues and sintering the mixture.

3. The method of producing sintered magnesite refractory material which comprises mixing relatively pure natural magnesite with aniline oil residues, forming the mixture into pre-determined forms and baking the formed mixture.

In testimony whereof I affix my signature.

KARL HARR.